United States Patent
Fukuda et al.

(10) Patent No.: US 7,970,238 B2
(45) Date of Patent: Jun. 28, 2011

(54) METHOD AND APPARATUS FOR ACQUIRING IMAGE OF INTERNAL STRUCTURE, AND COMPUTER PRODUCT

(75) Inventors: Mitsuaki Fukuda, Kawasaki (JP); Toshio Endoh, Kawasaki (JP); Takahiro Aoki, Kawasaki (JP); Masaki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 907 days.

(21) Appl. No.: 11/166,189

(22) Filed: Jun. 27, 2005

(65) Prior Publication Data

US 2006/0204132 A1 Sep. 14, 2006

(30) Foreign Application Priority Data

Mar. 4, 2005 (JP) ................................. 2005-060561

(51) Int. Cl.
  G06K 9/36 (2006.01)
  G06K 9/46 (2006.01)
(52) U.S. Cl. ........................................ 382/282; 382/190
(58) Field of Classification Search .......... 382/141–143, 382/145, 147–149, 154, 274–275, 282, 190, 382/284; 348/92, 125
  See application file for complete search history.

(56) References Cited

U.S. PATENT DOCUMENTS

| | | | |
|---|---|---|---|
| 4,644,585 A * | 2/1987 | Crimmins et al. ............ 382/283 |
| 4,702,607 A | 10/1987 | Kinameri | |
| 5,267,332 A * | 11/1993 | Walch et al. ................. 382/198 |
| 6,208,749 B1 | 3/2001 | Gutkowicz-Krusin et al. | |
| 6,292,576 B1 | 9/2001 | Brownlee | |
| 6,526,160 B1 | 2/2003 | Ito | |
| 6,608,691 B1 * | 8/2003 | Koike ............................ 358/1.1 |
| 6,738,510 B2 * | 5/2004 | Tsuruoka et al. ............. 382/167 |
| 6,819,805 B2 | 11/2004 | Usikov | |
| 6,845,142 B2 | 1/2005 | Ohishi | |
| 7,010,745 B1 * | 3/2006 | Shimada et al. ............... 715/205 |
| 7,133,069 B2 | 11/2006 | Wallach et al. | |
| 7,245,745 B2 | 7/2007 | Nagasuka et al. | |
| 7,359,484 B2 * | 4/2008 | Qiu et al. ....................... 378/122 |
| 7,406,198 B2 | 7/2008 | Aoki et al. | |
| 2003/0112921 A1 * | 6/2003 | Lang et al. ....................... 378/54 |
| 2004/0179723 A1 | 9/2004 | Sano et al. | |
| 2004/0240712 A1 | 12/2004 | Rowe et al. | |
| 2005/0148876 A1 | 7/2005 | Endoh et al. | |
| 2005/0152613 A1 * | 7/2005 | Okutsu et al. ................. 382/254 |

FOREIGN PATENT DOCUMENTS

| | | |
|---|---|---|
| JP | 61-140844 A | 6/1986 |
| JP | 9-15172 | 1/1997 |
| JP | 09-021620 A | 1/1997 |
| JP | 11-505612 A | 5/1999 |

(Continued)

OTHER PUBLICATIONS

Shigemi Computer English Translation of Japanese Patent No. 11-203478 Published Jul. 30, 1999), pp. 1-9.*

(Continued)

*Primary Examiner* — Daniel G Mariam
(74) *Attorney, Agent, or Firm* — Fujitsu Patent Center

(57) ABSTRACT

An apparatus for acquiring an internal-structure image of an object from a plurality of images of the object photographed by a photographing unit includes a control unit that controls the photographing unit to obtain the images under different photographing conditions; and an extracting unit that extracts a portion common to the images as the internal-structure image.

12 Claims, 10 Drawing Sheets

FOREIGN PATENT DOCUMENTS

| | | |
|---|---|---|
| JP | 11-203452 A | 7/1999 |
| JP | 11-203478 | 7/1999 |
| JP | 11-203478 A | 7/1999 |
| JP | 2000-036036 A | 2/2000 |
| JP | 2000-166874 A | 6/2000 |
| JP | 2001-266132 | 9/2001 |
| JP | 2002-373328 A | 12/2002 |
| JP | 2003-000580 A | 1/2003 |
| JP | 2003-308515 A | 10/2003 |
| JP | 2003-331272 A | 11/2003 |
| JP | 2004-070943 A | 3/2004 |
| JP | 2004-102562 A | 4/2004 |
| JP | 2004-265269 A | 9/2004 |
| JP | 2004-294129 A | 10/2004 |
| JP | 2005-508574 A | 3/2005 |
| WO | WO-96/35945 | 11/1996 |
| WO | WO 00/04499 * | 1/2000 |
| WO | WO-2004/021884 | 3/2004 |

OTHER PUBLICATIONS

"Japanese Office Action", English-language translation, mailed Jun. 30, 2009 in reference to JP App. No. 2005-060561.

European Search Report, mailed Nov. 2, 2009, in connection with EP patent application No. 05255769.

Japanese Office Action, mailed Nov. 17, 2009 reference to JP App. No. 2005-060561.

"Japanese Office Action" corresponding to JP 2005-060561, with English translation, mail date Mar. 2, 2010.

Official Interrogation mailed Feb. 8, 2011, by JPO in connection with JPO Appeal Trial No. 2010-12009, in reference to JP Patent Application 2005-60561; English-language translation.

* cited by examiner

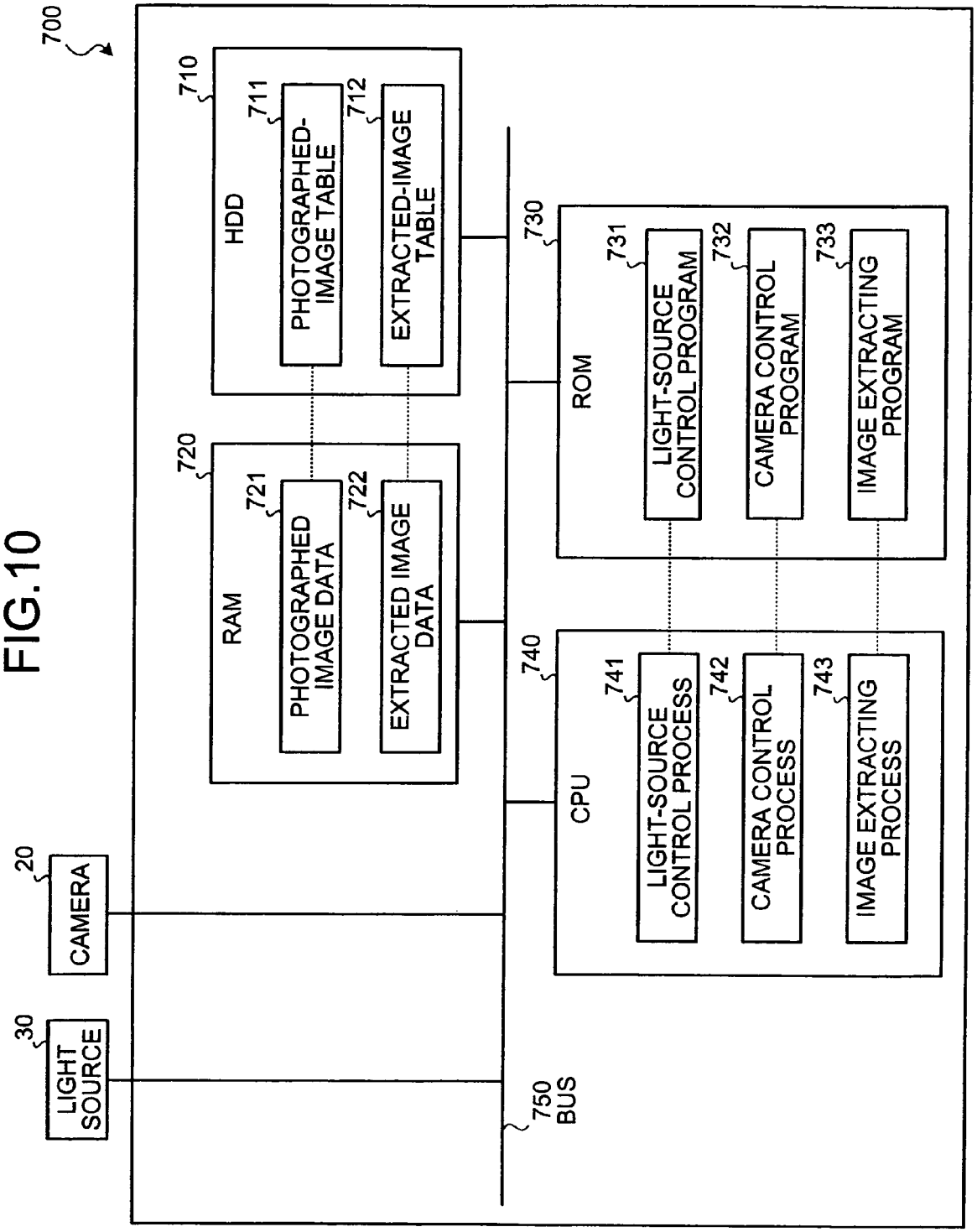

METHOD AND APPARATUS FOR ACQUIRING IMAGE OF INTERNAL STRUCTURE, AND COMPUTER PRODUCT

BACKGROUND OF THE INVENTION

1. Field of the Invention

The present invention relates to a technology for acquiring an image of an internal structure of an object photographed.

2. Description of the Related Art

In the field of nondestructive testing, there is a conventional technology for acquiring, from an image of an object obtained by photographing the object, an image of an internal structure of the object, by removing patterns expressing convexity or concavity (hereinafter, "convexity/concavity") on a surface of the object. For example, Japanese Patent Application Laid Open No. 2001-266132 discloses a technology for scanning a surface of an object with a line sensor from different positions to acquire information on the convexity/concavity. With this technology, it is possible to acquire the image of the internal structure by removing the information on the convexity/concavity from an image including both the information on the convexity/concavity and information on the internal structure.

However, the conventional technology requires a device, such as the line sensor, for acquiring the information on convexity/concavity, in addition to a photographing device for obtaining a surface and an internal structure of an object. As a result, a large-scale system is required, which leads to increased cost.

Moreover, because the images obtained by photographing and the information on convexity/concavity are different types of data, it is difficult to precisely remove the information on convexity/concavity from the photographed images. Therefore, the image of the internal structure is likely to deteriorate in image quality.

SUMMARY OF THE INVENTION

It is an object of the present invention to at least solve the problems in the conventional technology.

An apparatus according to one aspect of the present invention, which is for acquiring an internal-structure image of an object from a plurality of images of the object photographed by a photographing unit, includes a control unit that controls the photographing unit to obtain the images under different photographing conditions; and an extracting unit that extracts a portion common to the images as the internal-structure image.

A method according to another aspect of the present invention, which is for acquiring an internal-structure image of an object from a plurality of images of the object photographed by a photographing unit, includes controlling the photographing unit to obtain the images under different photographing conditions; and extracting a portion common to the images as the internal-structure image.

A computer-readable recording medium according to still another aspect of the present invention stores a computer program that causes a computer to execute the above method according to the present invention.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is a block diagram of a computer that executes a computer program for acquiring an image of an internal structure according to the embodiments of the present invention.

DETAILED DESCRIPTION OF THE PREFERRED EMBODIMENTS

Exemplary embodiments according to the present invention are explained in detail with reference to the accompanying drawings. The present invention is not limited to these embodiments.

Figure 1:
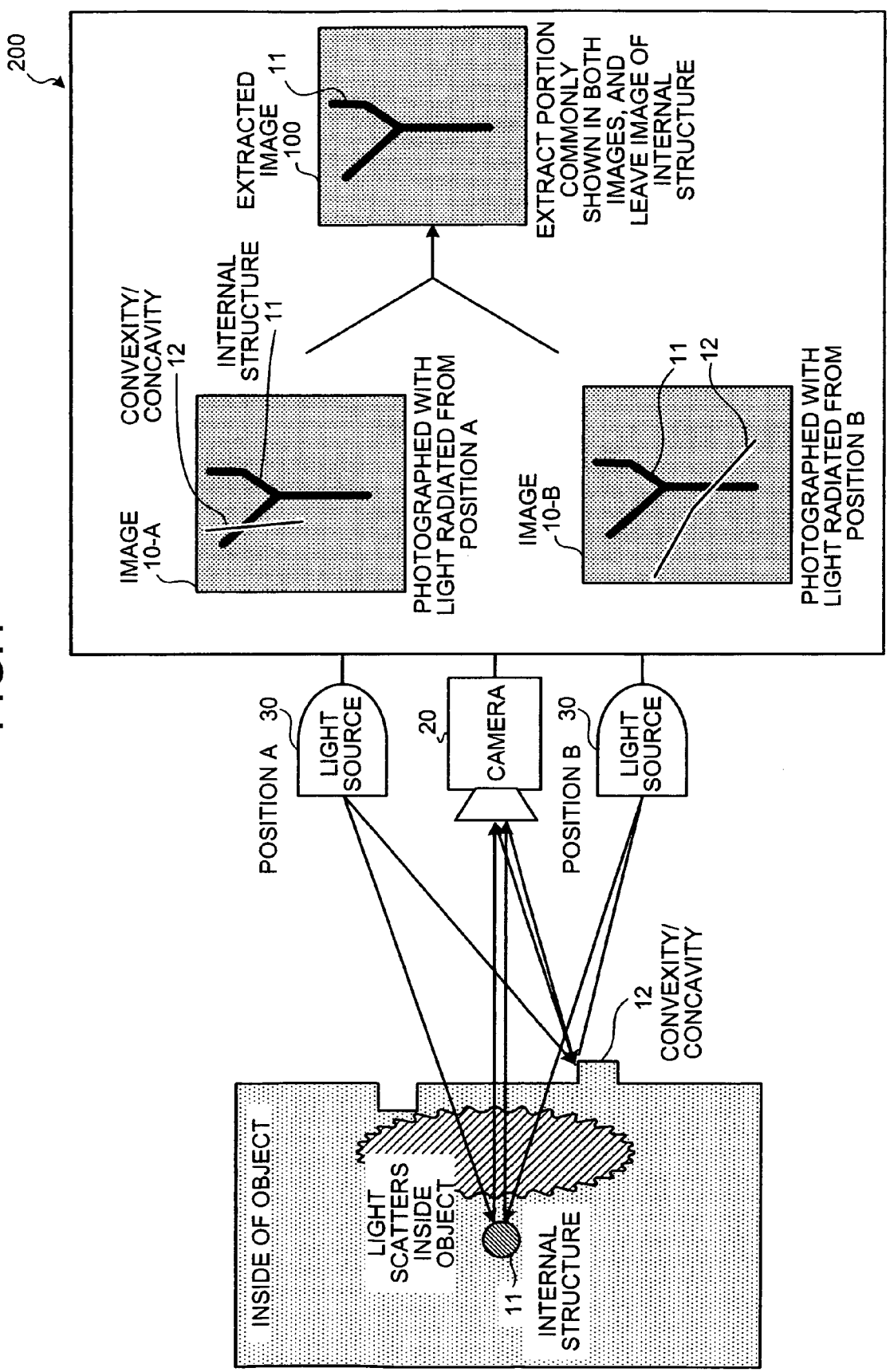
FIG. 1 is a schematic of an apparatus for acquiring an image of an internal structure according to a first embodiment.

FIG. 1 is a diagram of an apparatus for acquiring an image of an internal structure 200 according to a first embodiment of the present invention. The apparatus 200 acquires an image of an internal structure 11 of an object from photographed images of the object. Specifically, the apparatus 200 controls a camera 20 and a light source 30 to photograph the object to obtain a plurality of images of the object under different conditions. Then, the apparatus 200 extracts a portion commonly shown in the images obtained, to acquire the image of the internal structure 11.

The light source 30 radiates light from a position A on the object while the camera 20 photographs the object to obtain an image 10-A. Then, the light source 30 radiates light from a position B, which is shifted from the position A, while the camera 20 photographs the object to obtain an image 10-B. The camera 20 photographs the object from the same position.

Intensity of light reflected from a convexity/concavity 12 on a surface of the object changes significantly according to angles formed by the convexity/concavity 12, the light source 30, and an image pickup device, which is the camera 20. On the other hand, the intensity of light reflected from the internal structure 11 toward the image pickup device is unaffected by positions of the light source 30 or the image pickup device, as long as a distance therebetween is maintained the same. This is because the light incident in and reflected from the internal structure 11 scatters inside the object.

Therefore, the internal structure 11 appears substantially the same in the image 10-A and the image 10-B. However, the convexity/concavity 12 appears different in the image 10-A and the image 10-B. Accordingly, the apparatus 200 extracts a portion commonly shown in the image 10-A and the image 10-B to obtain an extracted image 100 that shows only the internal structure 11.

Therefore, the apparatus 200 can acquire an image of the internal structure 11 from image data without an additional device such as the line sensor. Moreover, the images of the internal structure 11 and the images of the convexity/concavity 12 are of the same type of data. Accordingly, a precise image of the internal structure 11 can be acquired without difficulty.

Figure 2:
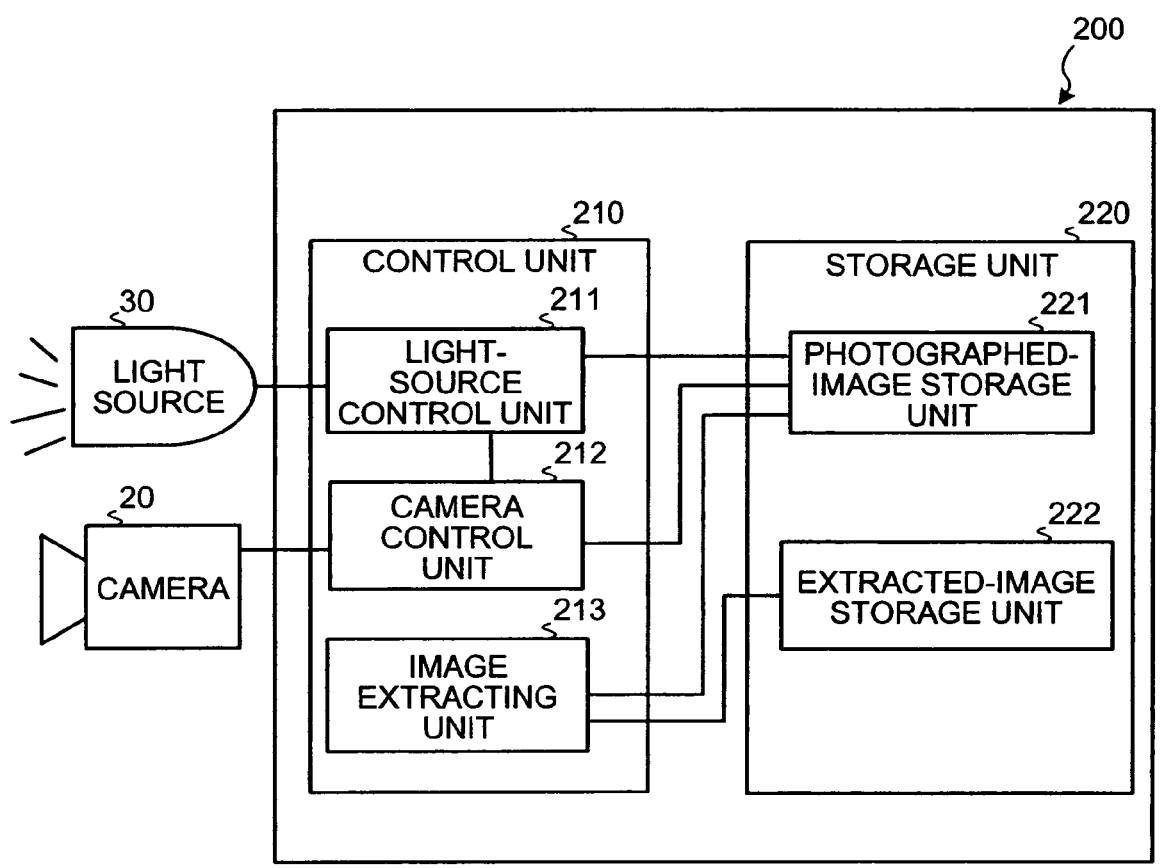
FIG. 2 is a block diagram of the apparatus shown in FIG. 1.

FIG. 2 is a block diagram of the apparatus 200. The apparatus 200 includes a control unit 210 and a storage unit 220.

The storage unit 220 stores data used for various processings performed by the control unit 210, and includes a photographed-image storage unit 221 and an extracted-image storage unit 222.

The photographed-image storage unit 221 stores data of images photographed by the camera 20 under different conditions.

The extracted-image storage unit 222 stores the extracted image 100 that is acquired by extracting a portion commonly shown in two images photographed under different conditions.

The control unit 210 controls the apparatus 200 to perform various processings, and includes a light-source control unit 211, a camera control unit 212, and an image extracting unit 213.

The light-source control unit 211 controls the light source 30 to radiate light on an object from different positions. Specifically, when the camera 20 photographs the object to obtain two images, the light-source control unit 211 moves the light source 30 to different positions for each image.

The camera control unit 212 controls the camera 20 to photograph an object to obtain images of the object. Specifically, after the light source 30 is set at a predetermined position by the light-source control unit 211, the camera control unit 212 controls the camera 20 to photograph the object to obtain a first image. Then, the light source 30 is set at a position different from the previous position, and the camera control unit 212 controls the camera 20 to photograph the object to obtain a second image.

The image extracting unit 213 extracts a portion commonly shown in a plurality of images photographed under different conditions to acquire an image that shows only the internal structure 11 of an object. Specifically, the image extracting unit 213 performs logical multiplication for two images photographed with light radiated from different directions in the photographed-image storage unit 221. Accordingly, the image extracting unit 213 extracts the extracted image 100 by leaving the image of the internal structure 11 commonly shown in both images, and removing the image of the convexity/concavity 12 having different appearance in each of the two images.

Figure 3:
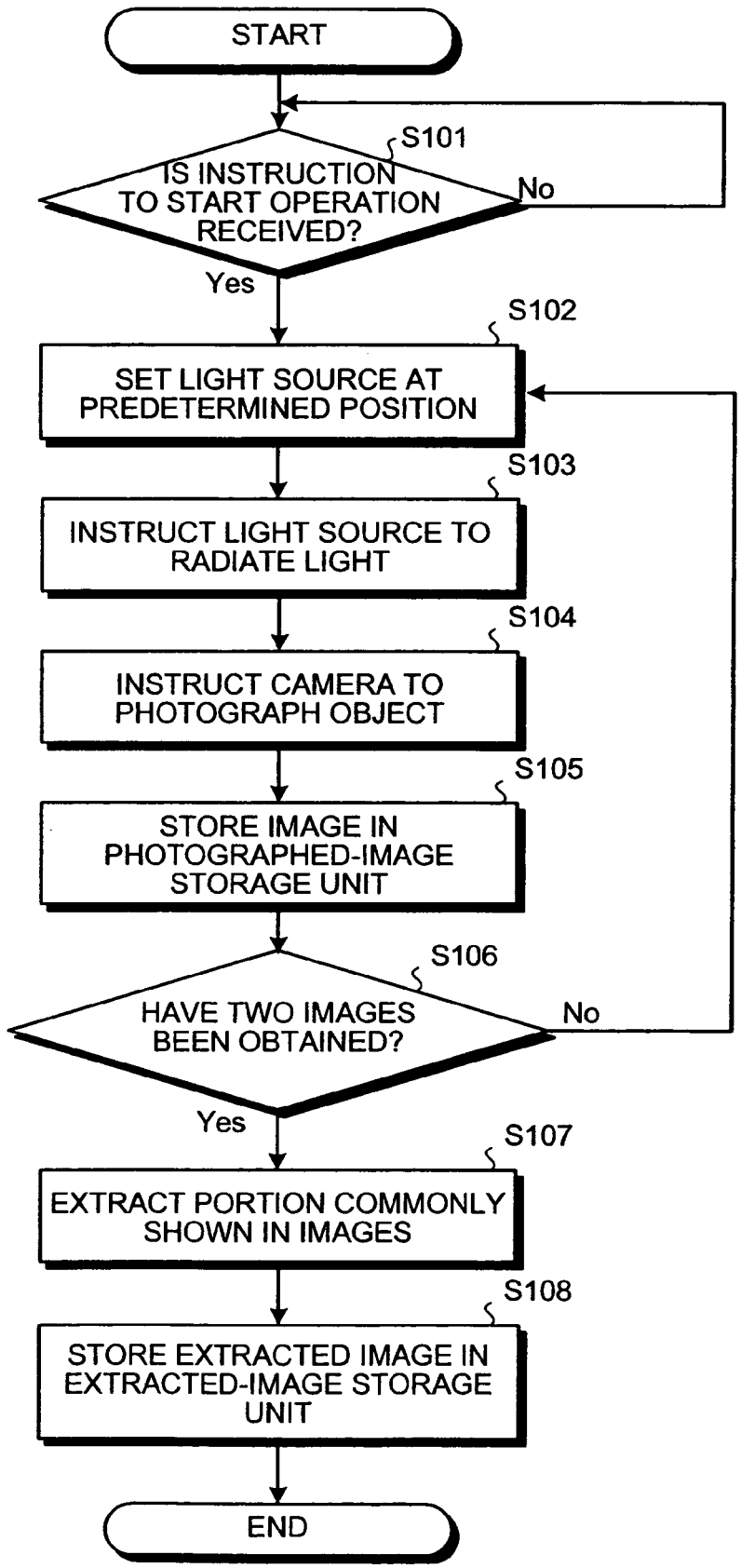
FIG. 3 is a flowchart of a process for acquiring an image of an internal structure according to the first embodiment.

FIG. 3 is a flowchart of a process for acquiring an image of the internal structure 11 performed by the apparatus 200. When an instruction to start operation is received at the apparatus 200 ("YES" at step S101), the light-source control unit 211 sets the light source 30 at a predetermined position (step S102), and instructs the light source 30 to radiate light to an object to be photographed (step S103).

The camera control unit 212 instructs the camera 20 to photograph the object (step S104), and stores data of an image of the object in the photographed-image storage unit 221 (step S105).

An image-number determining unit (not shown) determines whether two images have been obtained (step S106). When only one image has been obtained ("NO" at step S106), the process returns to step S102. Then, the light-source control unit 211 sets the light source 30 at a position different from the previous position, and the camera 20 photographs the object to obtain a second image with the light radiated from the different position. Data of the second image is stored in the photographed-image storage unit 221.

On the other hand, when the image-number determining unit determines that two images have been obtained ("YES" at step S106), the image extracting unit 213 extracts a portion commonly shown in both of the images (step S107). An image extracted is stored in the extracted-image storage unit 222 as an image of the internal structure 11 of the object (step S108). The internal structure 11 appears substantially the same in both of the images obtained because the light scatters inside the object, while the convexity/concavity 12 appears different in each of the images obtained depending on the position of the light source 30. Thus, an image of the portion extracted is the image of the internal structure 11 of the object.

In the first embodiment, the apparatus 200 controls the camera 20 and the light source 30 to obtain images of an object under different conditions. Then, the apparatus 200 extracts a portion commonly shown in the images, to acquire an image of the internal structure 11. Therefore, the image of the internal structure 11 can be easily acquired from image data without an additional device such as the line sensor. Moreover, because the images of the internal structure 11 and the convexity/concavity 12 are of the same type of data, a precise image of the internal structure 11 can be acquired without difficulty.

Figure 4:
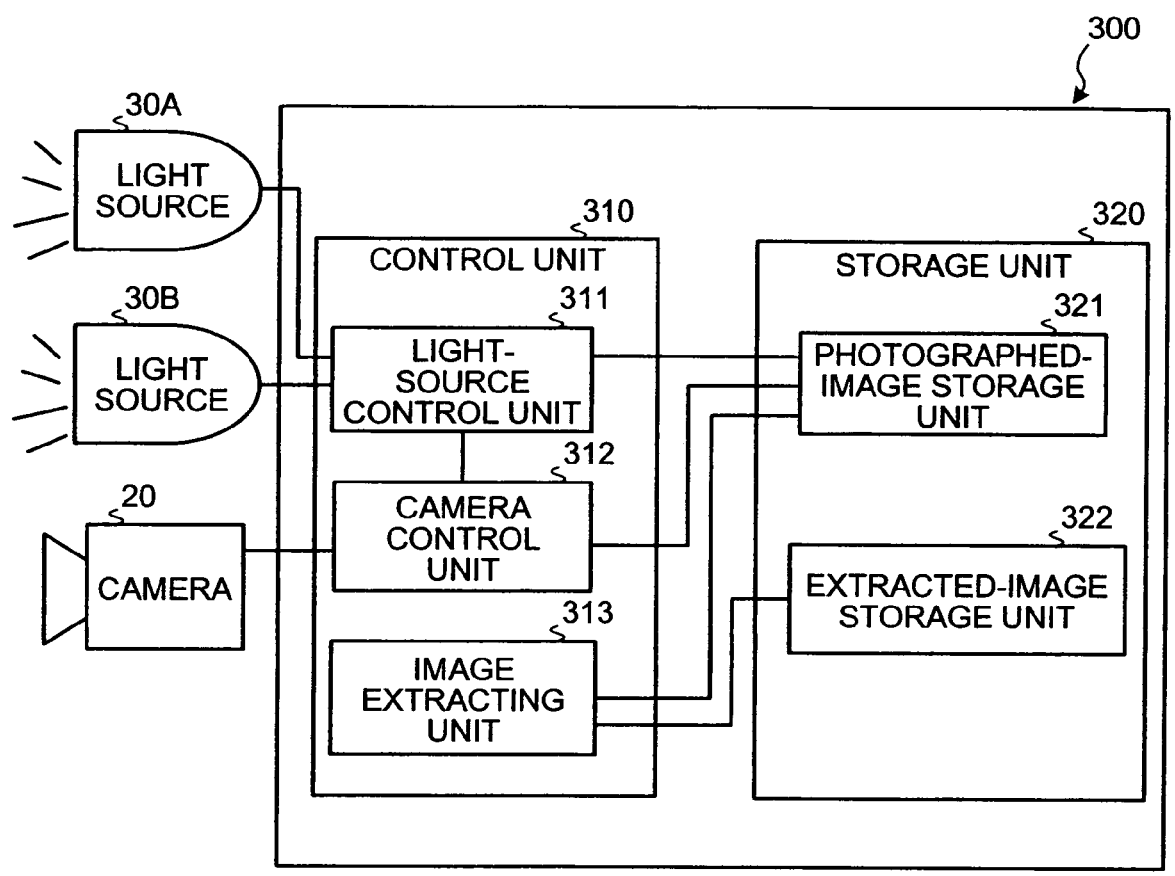
FIG. 4 is a block diagram of an apparatus for acquiring an image of an internal structure according to a second embodiment of the present invention.

An apparatus for acquiring an image of an internal structure according to a second embodiment of the present invention employs a plurality of light sources. FIG. 4 is a block diagram of an apparatus for acquiring an image of an internal structure 300 according to the second embodiment.

A light-source control unit 311 controls a plurality of light sources 30A and 30B. When the camera 20 photographs an object to obtain a first image, the light-source control unit 311 turns on the light source 30A. When the camera 20 photographs the object to obtain a second image, instead of moving the light source as in the first embodiment, the light-source control unit 311 turns off the light source 30A and turns on the light source 30B.

In the second embodiment, the light source does not have to be moved because a plurality of light sources is employed. Therefore, a plurality of images can be obtained under different conditions without difficulty.

Figure 5:
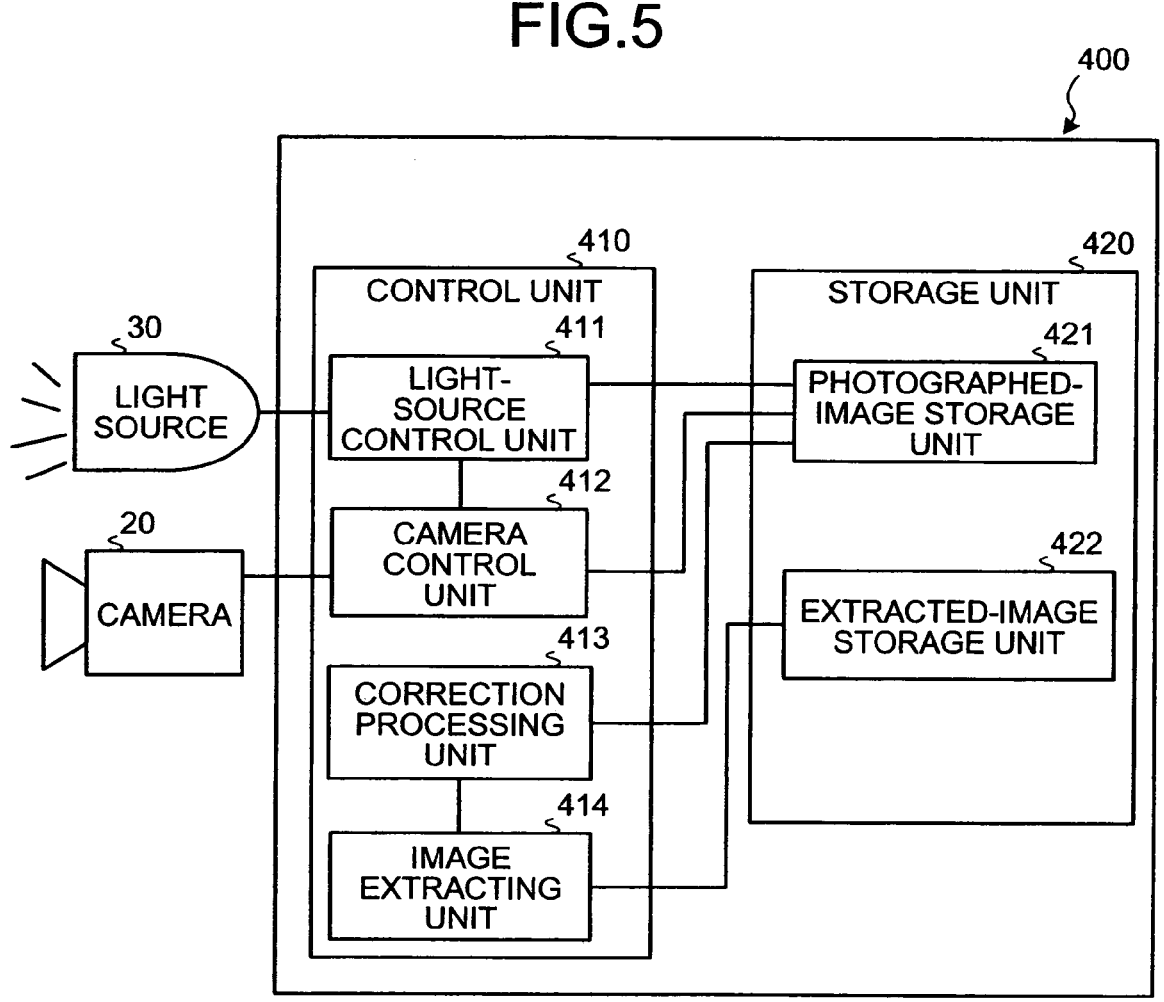
FIG. 5 is a block diagram of an apparatus for acquiring an image of an internal structure according to a third embodiment of the present invention.

According to a third embodiment of the present invention, images are corrected before extracting a portion commonly shown in the images to acquire an image of an internal structure of an object. FIG. 5 is a block diagram of an apparatus for acquiring an image of an internal structure 400 according to the third embodiment.

A control section 410 includes a correction processing unit 413. The correction processing unit 413 corrects data of images obtained by photographing an object stored in a photographed-image storage unit 421. For example, the images can have different luminance or different luminance distributions caused the different conditions under which the object is photographed. In this case, the correction processing unit 413 corrects these differences to make the images have substantially the same luminance distributions so that the internal structure 11 appears to be photographed under the same conditions.

Figure 6:
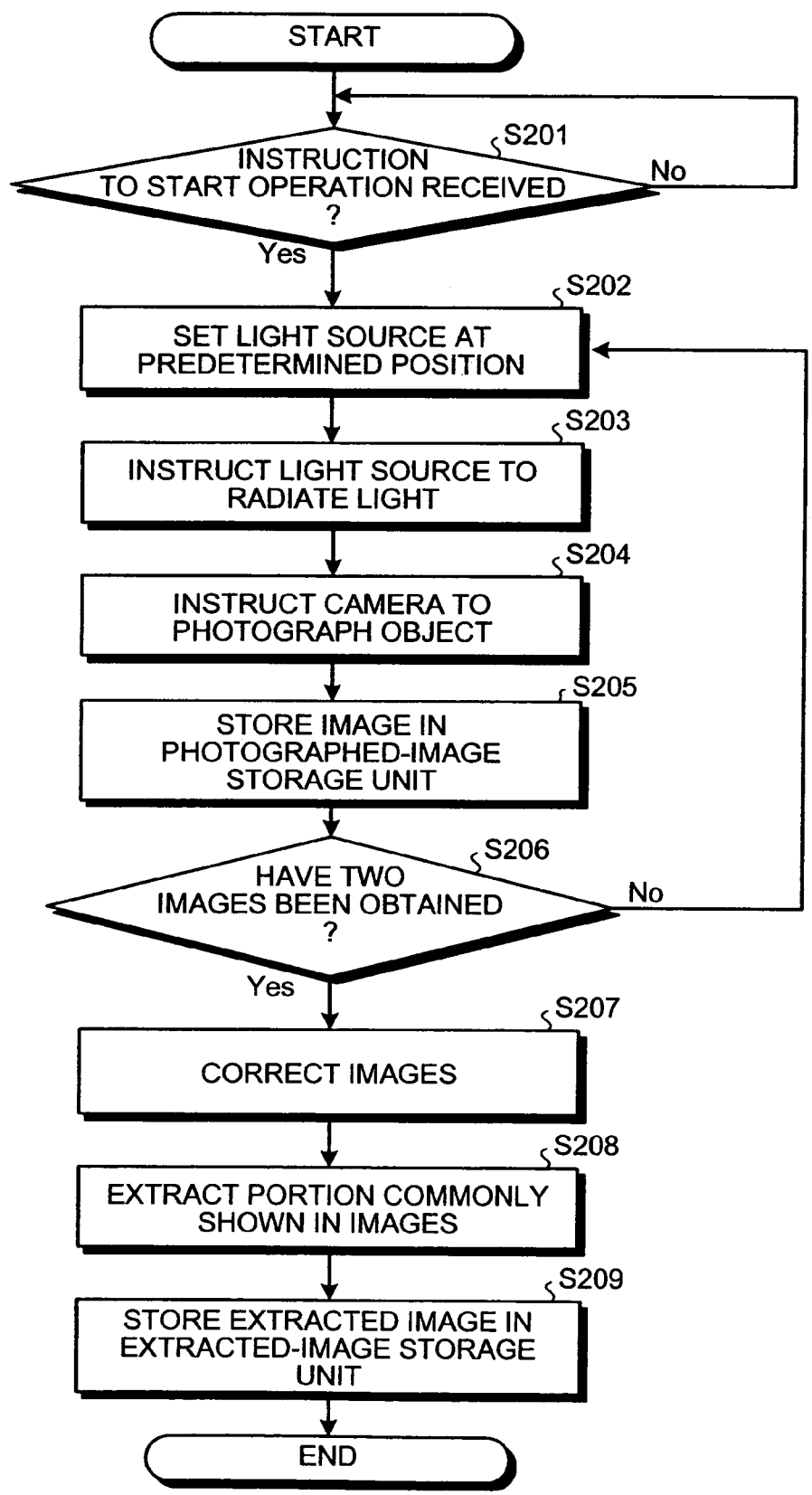
FIG. 6 is a flowchart of a process for acquiring an image of an internal structure according to the third embodiment.

FIG. 6 is a flowchart of a process for acquiring an image of the internal structure 11 performed by the apparatus 400. The processing is almost the same as that of the first embodiment shown in FIG. 3 except that a correction processing is added.

Specifically, after a second image is obtained ("YES" at step S206), the correction processing unit 413 corrects two images obtained (step S207). Then, an image extracting unit 414 extracts a portion commonly shown in both of the images (step S208). An image extracted is stored in an extracted-image storage unit 422 as an image of the internal structure 11 of the object (step S209).

According to the third embodiment, images are corrected before extracting a portion commonly shown in the images to acquire an image of the internal structure 11 of an object. For example, differences in luminance or luminance distribution are corrected so that the images of the internal structure 11 appear to be photographed under the same conditions. Therefore, the image of the internal structure 11 can be properly extracted.

Figure 7:
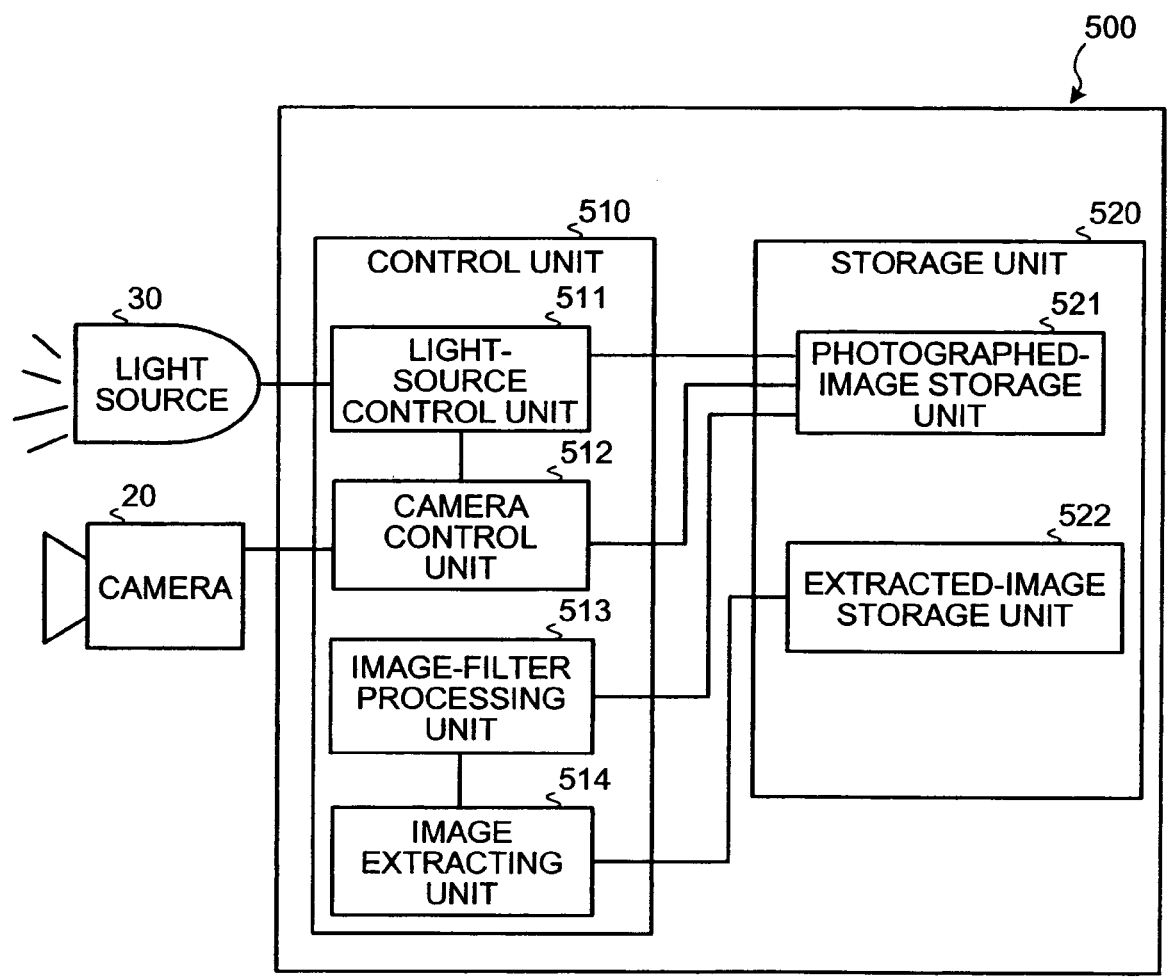
FIG. 7 is a block diagram of an apparatus for acquiring an image of an internal structure according to a fourth embodiment of the present invention.

According to a fourth embodiment of the present invention, characteristics of images obtained by photographing are extracted before a portion commonly shown in images is extracted. FIG. 7 is a block diagram of an apparatus for acquiring an image of an internal structure 500 according to the fourth embodiment.

A control section 510 includes an image-filter processing unit 513. The image-filter processing unit 513 applies an image filter to images stored in a photographed-image storage unit 521. For example, the image-filter processing unit 513 applies a differential filter to the images to model the images and eliminate three-dimensional characteristic.

Figure 8:
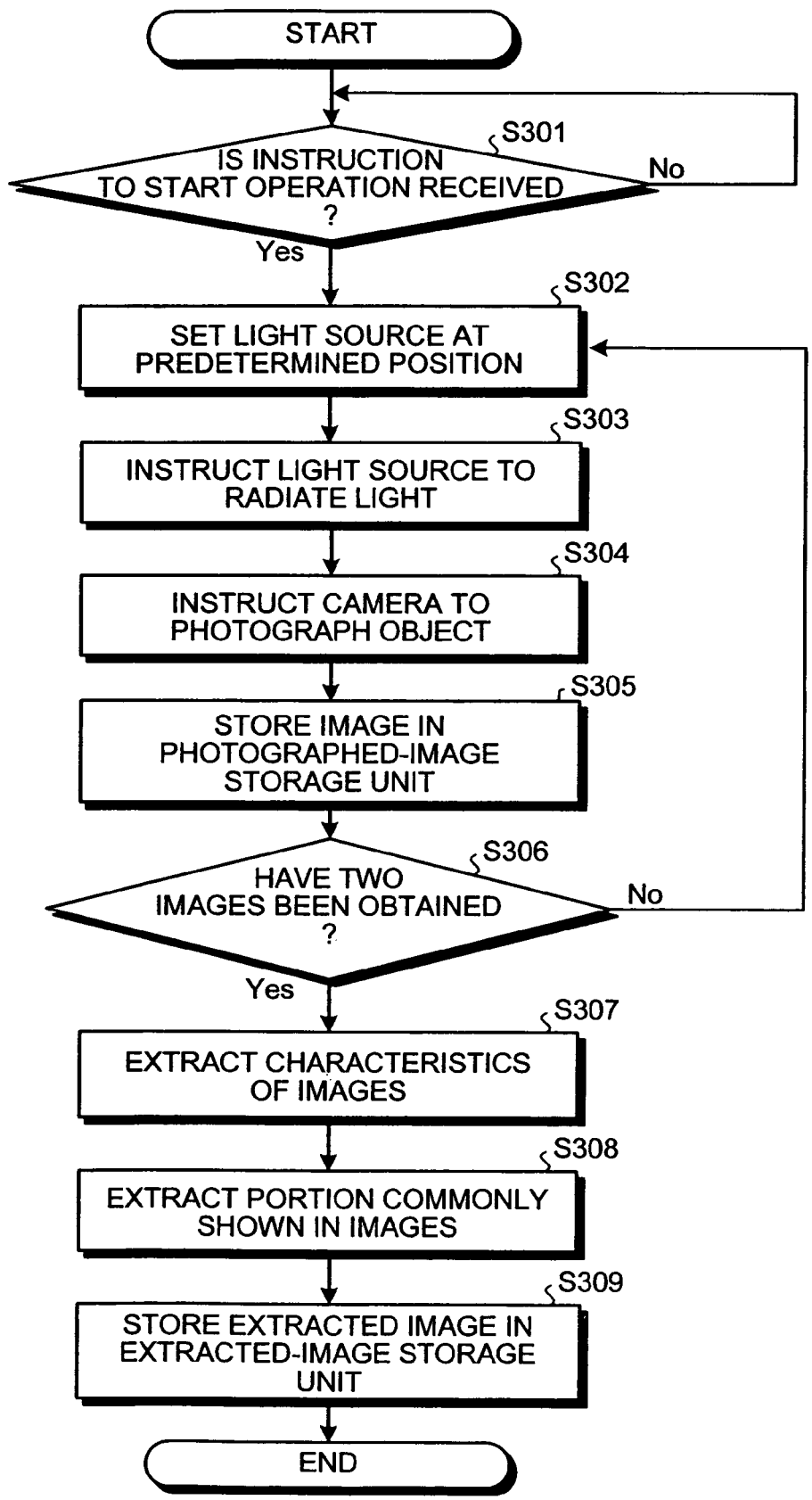
FIG. 8 is a flowchart of a process for acquiring an image of an internal structure according to the fourth embodiment.

FIG. 8 is a flowchart of a process for acquiring an image of the internal structure 11 performed by the apparatus 500. The processing is almost the same as that of the first embodiment shown in FIG. 3 except that an image filter processing is added.

Specifically, after a second image is obtained ("YES" at step S306), the image-filter processing unit 513 extracts characteristics of two images obtained (step S307). Then, an image extracting unit 514 extracts a portion commonly shown in both of the images (step S308). An image extracted is stored in an extracted-image storage unit 522 as an image of the internal structure 11 of the object (step S309).

According to the fourth embodiment, an image filter is applied to images before extracting a portion commonly shown in the images to acquire an image of the internal structure 11 of an object. For example, differential filters are applied to the images to model the images and extract certain characteristics of the images. Therefore, the image of the internal structure 11 can be precisely extracted.

Figure 9:
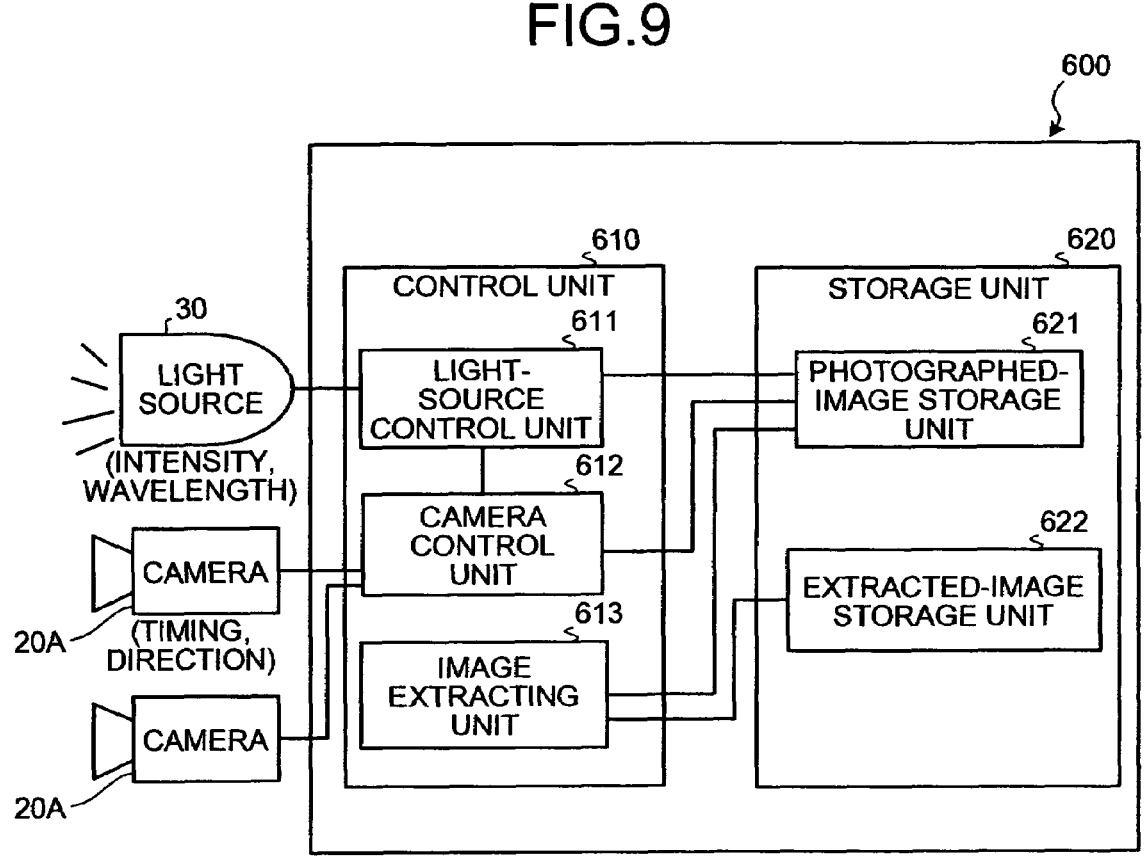
FIG. 9 is a block diagram of an apparatus for acquiring an image of an internal structure according to a fifth embodiment of the present invention.

The present invention is not limited to the embodiments described above. In a fifth embodiment of the present invention, various modifications are described with respect to each of the following components and features. FIG. 9 is a block diagram of an apparatus for acquiring an image of an internal structure 600 according to the fifth embodiment.

(1) Light Source 30

In the above embodiments, the direction of light radiated from the light source 30 is changed so that an object is photographed under different conditions. However, the intensity or the wavelength of the light can be changed.

(2) Camera 20

In the above embodiments, a position of the camera 20 is fixed, while moving the light source 30 or switching the light source 30 between a plurality of light sources provided. However, the camera 20 can be photograph an object from different directions or at different timings, or a plurality of cameras 20A, 20B can be employed.

(3) Number of Images

In the above embodiments, an object is photographed twice under different conditions to obtain two images, and a portion commonly shown in the images is extracted. However, more than two images can be obtained.

When more than two images are obtained, the differences of the images of the convexity/concavity 12 become more apparent between the images. Therefore, the images of the convexity/concavity 12 can be removed precisely.

(4) Extracting Method

In the above embodiments, logical multiplication is performed for images obtained by photographing under different conditions to extract the extracted image 100. However, a calculation can be performed to remove the images of the convexity/concavity 12 by comparing pixel values of the images, and extracting pixels so that the images have the same pixel value.

If the intensity of the light is different for each image, although the internal structure 11 appears substantially the same in all of the images, a density of the convexity/concavity 12 can vary between the images. Thus, the images of the convexity/concavity 12 can be precisely removed by performing the calculation of making the images have the same pixel value.

(5) System Configuration

The constituent elements illustrated are merely conceptual and may not necessarily physically resemble the structures shown in the drawings. For example, the devices need not necessarily have the structure that is illustrated. The devices as a whole or in parts can be broken down or integrated either functionally or physically in accordance with a load or use of the device. The functions of the devices are entirely or partially realized by a central processing unit or a computer program executed by the CPU or by hardware using wired logic.

All the automatic processes explained in the embodiments can be, entirely or in part, carried out manually. Similarly, all the manual processes explained in the embodiments can be entirely or in part carried out automatically by a known method. The sequence of processes, the sequence of controls, specific names, and data including various parameters can be changed as required unless otherwise specified.

(6) Program

The processings according to the embodiments of the present invention can be implemented on a computer program by executing a computer program. FIG. 10 is a block diagram of a computer 700 that executes a computer program for acquiring an image of an internal structure according to embodiments of the present invention.

The computer 700 functions as an apparatus for acquiring an image of an internal structure, and includes the camera 20, the light source 30, a hard disk drive (HDD) 710, a random access memory (RAM) 720, a read only memory (ROM) 730, a CPU 740, and a bus 750 that connects these components.

The ROM 730 stores the computer program that functions as the embodiments. Specifically, the ROM 730 stores a light-source control program 731, a camera control program 732, and an image extracting program 733. The programs 731 to 733 can be broken down or integrated.

The CPU 740 reads the programs 731 to 733 from the ROM 730 and executes the programs 731 to 733. Accordingly, the programs 731 to 733 function as a light-source control process 741, a camera control process 742, and an image extracting process 743. The processes 741 to 743 correspond to the light-source control unit 211, the camera control unit 212, and the image extracting unit 213 shown in FIG. 2, respectively.

The HDD 710 includes a photographed-image table 711. and an extracted-image table 712 that correspond to the photographed-image storage unit 221 and the extracted-image storage unit 222 shown in FIG. 2, respectively. The CPU 740 registers an extracted image in the extracted-image table 712, reads photographed image data 721 from the photographed-image table 711 and extracted image data 722 from the extracted-image table 712, and stores the data in the RAM 720. Then, the CPU 740 executes a processing to extract an image of an internal structure of an object based on the photographed image data 721 and the extracted image data 722 stored in the RAM 720.

According to the present invention, it is possible to obtain an image of an internal structure of an object with ease.

Moreover, according to the present invention, it is possible to obtain an image of the internal structure with high accuracy.

Furthermore, according to the present invention, it is possible to appropriately extract an image of the internal structure from image data.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for acquiring an internal-structure image of an object from a plurality of images of the object, the apparatus comprising:
    a photographing unit to photograph the object by capturing light reflected from the object, the light radiated from at least one of a plurality of light sources;
    a control unit to control the photographing unit and the at least one light source to obtain a first image and a second image under different photographing conditions in which angles formed by the at least one light source, convexity/concavity on surface of the object, and the photographing unit are different; and
    an extracting unit to extract a third image that is common to the first image and the second image, the third image corresponding to the internal-structure image.

2. The apparatus according to claim 1, wherein the photographing conditions further include at least one of intensity of the light, wavelength of the light, and photographing time.

3. The apparatus according to claim 1, further comprising a correcting unit to correct at least one of the first and the second images, wherein
    the extracting unit to extract an image portion commonly shown in the first and the second images corrected.

4. The apparatus according to claim 1, further comprising a characteristic extracting unit to extract a characteristic of the first and the second images, wherein
    the extracting unit to extract an image portion commonly shown in a plurality of images generated by extracting the characteristic of the first and the second images.

5. A method of acquiring an internal-structure image of an object from a plurality of images of the object photographed by a photographing unit, the method comprising:
    photographing a first image of the object by capturing light reflected from the object, the light radiated from at least one of light sources;
    controlling the photographing unit and the light source to change photographing conditions such that angles formed by the light source, convexity/concavity on surface of the object, and the photographing unit are different;
    photographing a second image of the object by capturing the light reflected from the object; and
    extracting a third image that is common to the first image and the second image, the third image corresponding to the internal-structure image.

6. The method according to claim 5, wherein
    the photographing conditions further include at least one of intensity of the light, wavelength of the light, and photographing time.

7. The method according to claim 5, further comprising correcting at least one of the first and the second images, wherein
    the extracting includes extracting an image portion commonly shown in the first and the second images corrected.

8. The method according to claim 5, further comprising detecting a characteristic of the first and the second images, wherein
    the extracting includes extracting an image portion commonly shown in a plurality of images generated by extracting the characteristic of the first and the second images.

9. A computer-readable recording medium that stores a computer program for acquiring an internal-structure image of an object from a plurality of images of the object photographed by a photographing unit, wherein the computer program causes a computer to execute;
    photographing a first image of the object by capturing light reflected from the object, the light radiated from at least one of light sources;
    controlling the photographing unit and the light source to change photographing conditions such that angles formed by the light source, convexity/concavity on surface of the object, and the photographing unit are different;
    photographing a second image of the object by capturing the light reflected from the object; and
    extracting a third image that is common to the first image and the second image, the third image corresponding to the internal-structure image.

10. The computer-readable recording medium according to claim 9, wherein
    the photographing conditions further include at least one of intensity of the light, wavelength of the light, and photographing time.

11. The computer-readable recording medium according to claim 9, wherein the computer program further causes the computer to execute correcting at least one of the first and the second images, wherein
    the extracting includes extracting an image portion commonly shown in the first and the second images corrected.

12. The computer-readable recording medium according to claim 9, wherein the computer program further causes the computer to execute detecting a characteristic of the first and the second images, wherein
    the extracting includes extracting an image portion commonly shown in a plurality of images generated by extracting the characteristic of the first and the second images.

* * * * *